US012370650B2

(12) United States Patent
Nemoto

(10) Patent No.: US 12,370,650 B2
(45) Date of Patent: Jul. 29, 2025

(54) TWEEZERS DEVICE

(71) Applicant: Hakko Corporation, Osaka (JP)

(72) Inventor: Hisao Nemoto, Amagasaki (JP)

(73) Assignee: HAKKO CORPORATION, Osaka (JP)

( * ) Notice: Subject to any disclaimer, the term of this patent is extended or adjusted under 35 U.S.C. 154(b) by 876 days.

(21) Appl. No.: 17/571,014

(22) Filed: Jan. 7, 2022

(65) Prior Publication Data

US 2022/0226968 A1 Jul. 21, 2022

(30) Foreign Application Priority Data

Jan. 20, 2021 (JP) ................................ 2021-006845

(51) Int. Cl.
*B25B 9/02* (2006.01)

(52) U.S. Cl.
CPC ..................................... *B25B 9/02* (2013.01)

(58) Field of Classification Search
CPC ........................................................ B25B 9/02
See application file for complete search history.

(56) References Cited

U.S. PATENT DOCUMENTS 3,804,320 A * 4/1974 Vandermark ........ B23K 3/0476 228/19
5,145,101 A 9/1992 Brown et al.
5,385,471 A * 1/1995 Chuen ...................... A61C 3/10 433/161
6,750,431 B2 * 6/2004 Miyazaki ........... H05K 13/0491 294/99.2
6,972,396 B2 * 12/2005 Miyazaki ............... B23K 3/033 219/229
2011/0068594 A1 * 3/2011 Fortune ..................... B25B 9/02 294/99.2

* cited by examiner

*Primary Examiner* — Stephen A Vu
(74) *Attorney, Agent, or Firm* — Squire Patton Boggs (US) LLP

(57) ABSTRACT

A tweezers device is provided having a first leg, a second leg, and a rotating shaft to rotatably connect the first leg and the second leg. A leaf spring biases the first leg and the second leg in a rotating direction of the rotating shaft, working to push away the end of the first leg and the second leg. An opening width-adjusting member is provided to adjust an acceptable opening width between the end of the first leg and the second leg by the rotation of a width-adjusting wheel. The width-adjusting wheel is positioned distally to the rotating shaft, and is rotatable on the axis along the opening direction of the first leg and the second leg.

18 Claims, 7 Drawing Sheets

TWEEZERS DEVICE

CROSS-REFERENCE

This application claims priority to and the benefit of JP application number JP2021-006845, filed on Jan. 20, 2021, and incorporated herein by reference in its entirety.

TECHNICAL FIELD

The present invention relates to a tweezers device.

BACKGROUND TECHNOLOGY

Conventionally, tweezers devices are known for use in soldering and desoldering work of electronic components. As disclosed in Patent Document 1 below, this type of tweezers device has a pair of leg rotatably connected by a hinge, and a soldering iron is attached to each of the pair of leg. In the tweezers device disclosed in Patent Document 1, as shown in FIG. 5, a spring 83 to urge the pair of leg 81, 82 in a direction where the end of the pair of leg 81, 82 spreads outward, and a screw 84 to limit the opening width between the end of the legs 81 and 82 is provided. By turning the screw 84, the acceptable width opening at the end of the pair of legs 81 and 82 can be changed, and the movement of the pair of legs 81 and 82 can be reduced which suppress deterioration of the work efficiency

PRIOR ART DOCUMENT

Patent Document

[Patent Document 1] U.S. Pat. No. 5,145,101

SUMMARY OF INVENTION

However, in tweezers device disclosed in Patent Document 1, the handling of the screw 84 to adjust the acceptable opening width at the end of the pair of legs 81 and 82 could be troublesome. That is, since the screw 84 is arranged on the hand side (on the proximal end than the hinge 85) of the pair of legs 81 and 82, the screw 84 cannot be operated by the hand holding the tweezers device, and need to operate the screw 84 with the other hand.

An object of the present invention is to provide a tweezers device which can easily perform the adjustment of the allowable opening width between the end of the pair of legs.

The tweezers device according to one aspect of the present invention has a first mounting portion for attaching a first tip, a first leg to hold said first mounting portion, a second mounting portion for attaching a second tip, a second leg to hold said second mounting portion, a rotating shaft to rotatably connect said first leg and said second leg, a bias member to bias said first leg and said second leg in a rotating direction of said rotating shaft, working to push away said first distal end of said first leg and said second distal end of said second leg, and an open width adjustment means including a rotatable width adjustment wheel, wherein an acceptable opening width between said first distal end and said second distal end is adjusted by the rotation of said width adjustment wheel. Said width adjustment wheel is positioned distally toward said first distal end and said second distal end than said rotating shaft, and is rotatable centering on the axis along the opening direction of said first distal end and said second distal end.

In the above tweezers device, the width adjusting wheel for adjusting the acceptable opening width between the first distal end of the first leg and the second distal end of the second leg is arranged on the distal side toward the first distal end and the second distal end than said rotating shaft. Therefore, using the thumb of the hand holding the tweezers device, the width adjusting wheel can be operated. Moreover, the axial center of the width adjusting wheel extends in the direction along the opening direction of the first distal end and the second distal end. Therefore, it is easy to rotate the width adjusting wheel in the direction in which the thumb of the hand holding the tweezers device can be moved. That is, it is easy to operate the width adjusting wheel with the hand holding the tweezers device. Therefore, the acceptable opening width between the ends of the pair of legs can be easily adjusted. Further, since the width adjusting wheel is located on the distal side of the rotation shaft, the tweezers device does not become large.

The bias member may include a leaf spring having a first end engaged to the first leg and a second end engaged to the second leg, which is placed along the first leg and the second leg.

In this embodiment, the leaf spring is used to bias the first leg and the second leg. Since the leaf spring is placed along the first leg or the second leg, the bias member can be made inconspicuous.

The tweezers device may further include an adjusting member to adjust the position between the first distal end of the first leg and the second distal end of the second leg in the direction of said rotating shaft. The adjusting member may include a position adjusting wheel and an eccentric shaft provided in a position eccentric from the center of said position adjusting wheel. Further, the leaf spring may be formed with an elongated hole. In this case, the eccentric shaft of said position adjusting wheel is inserted into said elongated hole, and by the rotation of said position adjusting wheel, the relative position between the first distal end and the second distal end is changed in the direction of said rotating shaft.

In this embodiment, the eccentric shaft revolves by rotating the position adjusting wheel, so the relative position of the position adjusting wheel center with respect to the leaf spring changes. As a result, the relative position between the first distal end and the second distal end in the direction of the rotation shaft changes. Therefore this could be used when it is desired to arrange the second distal end at a position slightly deviated from the first distal end in the rotating shaft direction, or when the first distal end and the second distal end are slightly deviated in the rotation axis direction and needs to be aligned. Moreover, the position between the first distal end and the second distal end can be adjusted with a simple configuration in which the eccentric shaft of the position adjusting wheel is inserted through the elongated hole formed in the leaf spring.

The tweezers device according to another aspect of the present invention, the tweezers device has a first mounting portion for attaching a first tip, a first leg to hold said first mounting portion, a second mounting portion for attaching a second tip, a second leg to hold said second mounting portion, a bias member having a first bias portion where the first mounting portion is fixed and a second bias portion where the second mounting portion is fixed, wherein the bias member bias the first leg and the second leg in a direction to push away said first distal end of said first leg and said second distal end of said second leg from each other, and an open width adjusting means including a rotatable width adjustment wheel, an acceptable opening width between the first distal end and the second distal end is adjusted by the rotation of the width adjustment wheel. The width adjustment wheel is rotatable centering on the axis along the opening direction of said first distal end and said second distal end at a position distally toward said first distal end and said second distal end than the connecting portion of said first bias portion and said second bias portion.

In the above tweezers device, the width adjusting wheel for adjusting an acceptable opening width between the first distal end of the first leg and the second distal end of the second leg is provided at a position of the first distal end and the second distal end side than the connecting portion of the first bias portion or the second bias portion. Therefore, with the thumb of the hand holding the tweezers device, the width adjusting wheel can be touched. Moreover, the axial center of the width adjusting wheel extends in the direction along the opening direction of the first distal end and the second distal end. Therefore, it is easy to rotate the width adjusting wheel in the direction in which the thumb of the hand holding the tweezers device can be moved. That is, it is easy to operate the width adjustment wheel with the hand holding the tweezers device. This makes the adjustment of the acceptable opening width between the distal ends of the pair of legs easy. Further, since the width adjusting wheel is located on the distal side than the connecting portion, the tweezers device does not become large.

In the above tweezers device, the width adjusting wheel may be in contact with a surface of the first leg opposite to the second leg. In this case, the open width adjusting means may include a stopper which is positioned on the second leg on the side opposite to the first leg, which the distance between the width adjusting wheel and the stopper changes by the rotation of the width adjusting wheel. The acceptable opening width is regulated by the stopper and the width adjusting wheel.

In this embodiment, the width adjusting wheel and the stopper are located on the outer side the first leg and the second leg. The acceptable opening width of the first distal end and the second distal end is adjusted by changing the distance between the width adjusting wheel and the stopper.

The acceptable opening width may be adjustable until the first soldering tip and the second soldering tip comes into contact. In this embodiment, a very small IC component may be pinched. Also, when the first tip and the second tip in contact to each other, the tweezers device may be used as a soldering iron.

The width adjusting wheel may be rotatably held in place so that it will not be pushed away from said first leg.

In this embodiment, since the width adjusting wheel is held so as not to be separated from the first leg, when the operation of closing both legs is performed, the width adjusting wheel will move along together with the first leg. Therefore, it is possible to avoid the width adjusting wheel falling off from the first leg.

The first mounting portion is positioned on the opposing side of the second leg with respect to said first leg, and a space may be formed between said first leg and second leg. In this case, the width adjusting wheel may be arranged within this space.

In this embodiment, the width adjusting wheel is provided in the space between the first mounting portion for mounting the first tip, and the first leg for holding the first mounting portion. That is, the width adjusting wheel is arranged in the space between the members required as a tweezers device. Therefore, it is possible to prevent the tweezers device from becoming large.

The above tweezers device may further include a positon adjusting wheel. In this case, upon rotation of the position adjusting wheel, it may adjust the position between the first distal end and the second distal end in the direction orthogonal to the virtual plane formed by the movement trace of the first leg and the second leg.

In this embodiment, a position adjusting wheel is provided in addition to the width adjusting wheel. The adjustment of acceptable opening width, and the adjustment of position between the first distal end and the second distal end in the rotating shaft direction are done by the rotation of respective wheels. Therefore, it is possible to provide a tweezers device that can perform two types of adjustments, and both adjustment are easy to operate.

The width adjusting wheel and the position adjusting wheel may be rotatable around the axis parallel to each other.

In this embodiment, the adjustment of the acceptable opening width and the adjustment of the position between the first distal end and the second distal end in the rotating shaft direction, can be done by operation in the same direction.

The above tweezers device may further comprise a housing which covers the first mounting portion and the second mounting portion. In this case, the width adjustment wheel and the position adjustment wheel may expose from said housing from the same direction.

In this embodiment, the two adjustments (adjustment of the acceptable opening width and adjustment of the position between the first distal end and the second distal end in the rotation shaft direction) may be accessed from the same direction with respect to the housing. Therefore, the two adjustments can be made without changing the orientation of the housing.

The housing may have a first housing which covers said first mounting portion, and a second housing which covers said second mounting portion. In this case, the width adjusting wheel may be arranged in said first housing so a part of the width adjusting wheel expose from said first housing, and the positon adjusting wheel may be arranged in said second housing so a part of said position adjusting wheel expose from said second housing.

In this embodiment, the width adjusting wheel and the position adjusting wheel are separately arranged in the first housing and the second housing. Therefore, when using the tweezers device, it becomes easy to distinguish the width adjustment wheel and the position adjustment wheel.

The width adjusting wheel and the position adjusting wheel may be arranged that it will partially overlap when seen from side view.

In this embodiment, the space required for arranging the width adjusting wheel and the position adjusting wheel can be suppressed. Therefore, it is possible to prevent the tweezers from becoming large.

As described above, according to the present invention, the adjustment of the acceptable opening width between the ends of the pair of legs may be easily performed.

DETAILED DESCRIPTION

The embodiments of the present invention will be described in detail with reference to the drawings below.

Figure 1:
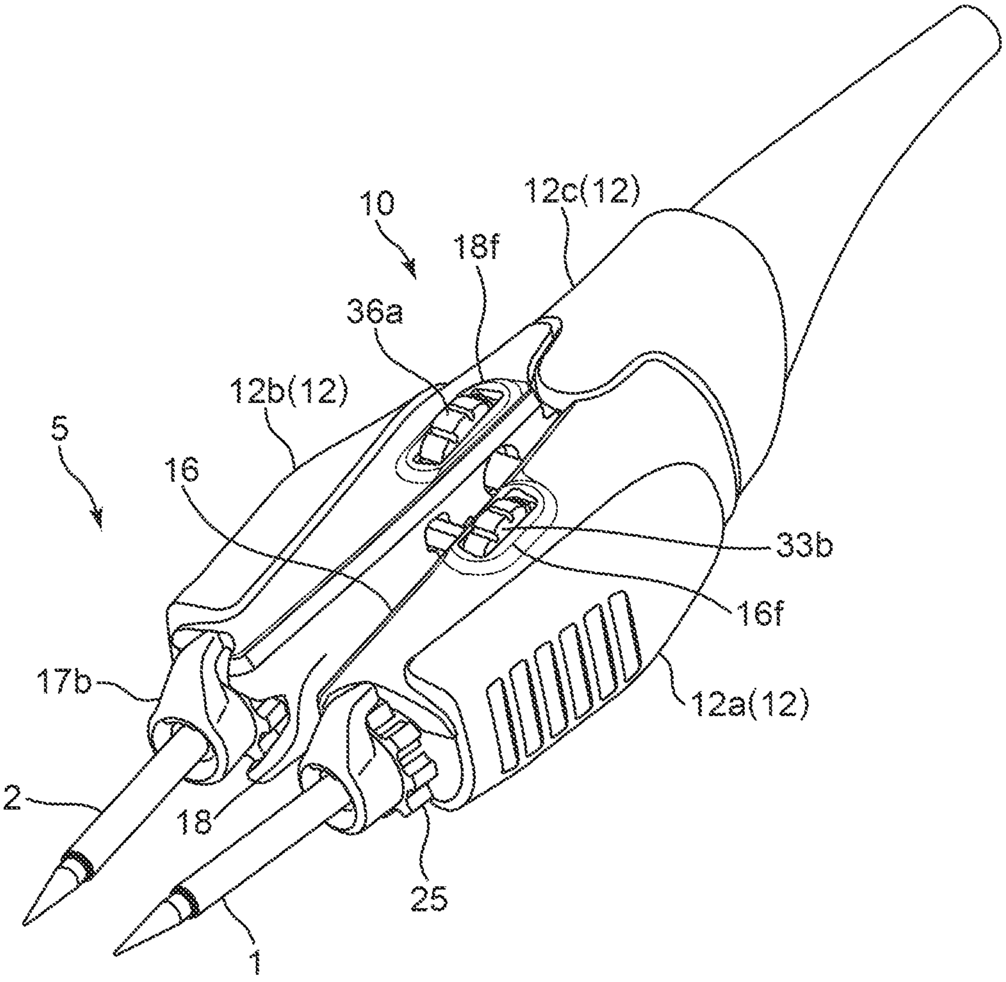
FIG. 1 is a perspective view of a soldering device to which the tweezers device according to the first embodiment is applied.

As shown in FIG. 1, the tweezers device 10 according to the first embodiment is used by attaching a pair of soldering tips 1 and 2. By attaching the pair of tips 1 and 2 (first tip and second tip) to the tweezer device 10, a soldering device 5 for attaching/detaching electronic components is configured.

The tweezers device 10 includes a housing 12, having a first housing 12*a* on the side where the first tip 1 is held, a second housing 12*b* on the side where the second tip 2 is held, and a proximal housing 12*c* located on the proximal end side of the first housing 12*a* and the second housing 12*b*.

Figure 2:
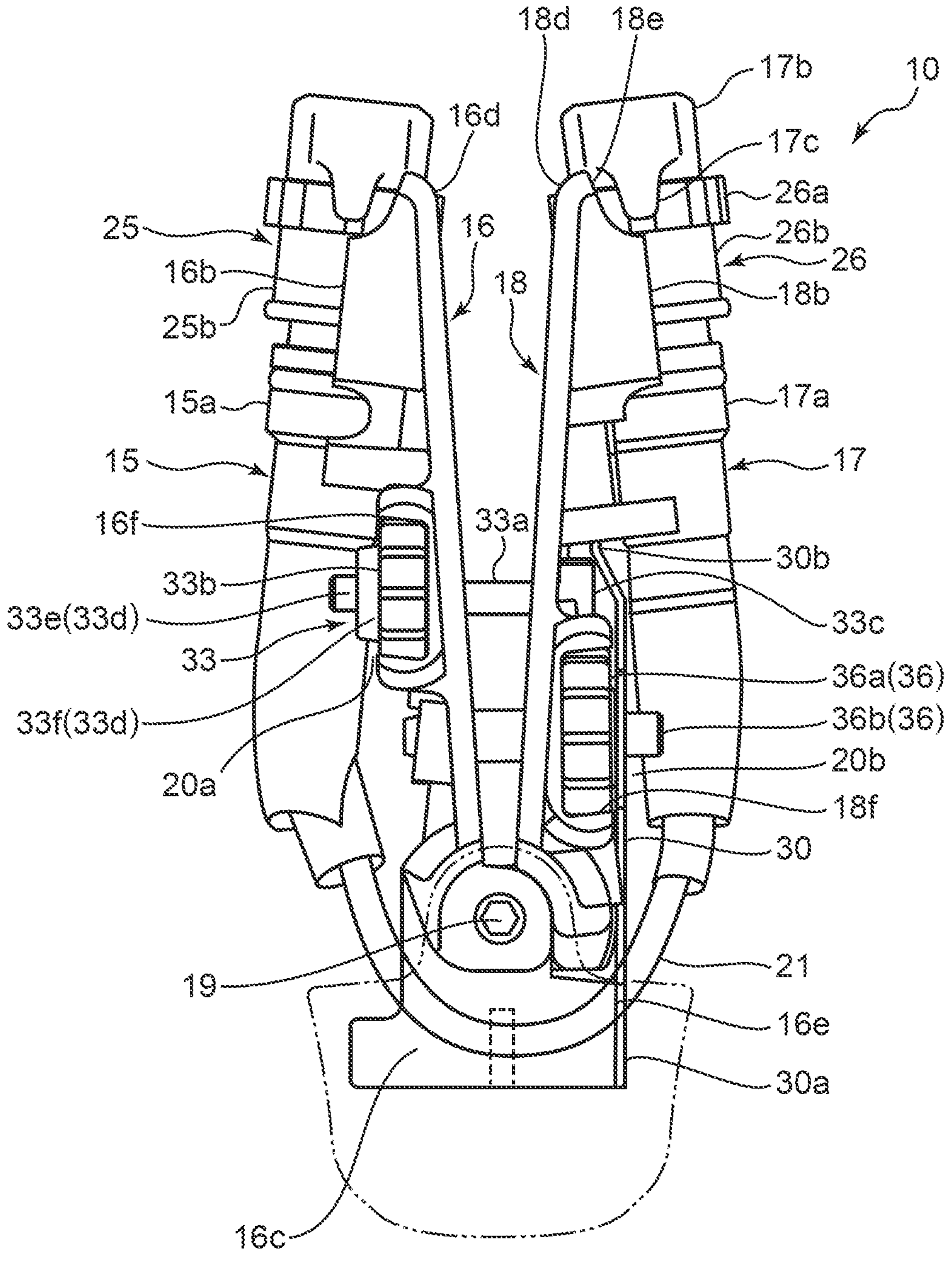
FIG. 2 is a view showing the tweezers device with the housing removed.

As shown in FIG. 2, the tweezers device 10 includes a first mounting portion 15 configured to mount the first tip 1, a first leg 16 to hold the first mounting portion 15, a second mounting portion 17 configured to mount the second tips 2, second leg 18 to hold the second mounting portion 17, and a rotating shaft 19 to rotatably connect the first leg 16 and the second leg 18. Although the housing 12 is omitted in FIG. 2, the first housing 12*a* is attached to the first leg 16, and the base portion 15*a* of the proximal first mounting portion 15 is arranged in the first housing 12*a*. Further, the second housing 12*b* is attached to the second leg 18, and the base portion 17*a* of the second mounting portion 17, which will be described later, is arranged in the second housing 12*b*.

A power supply line 21 is connected to the first mounting portion 15, and the electric power supplied through the power supply line 21 causes the first tip 1 attached to the first mounting portion 15 to generate heat. The power supply line 21 is also connected to the second mounting portion 17, and by the electric power supplied through the power supply line 21, the second tip 2 attached to the second mounting portion 17 generates heat.

The first mounting portion 15 is positioned on the opposite side of the second leg 18 relative to the first leg 16. The second mounting portion 17 is positioned on the opposite side of the first leg 16 relative to the second leg 18. That is, the first mounting portion 15 and the second mounting portion 17 are positioned outside of the first leg 16 and the second leg 18.

Further, a space 20*a* is formed between the first mounting portion 15 and the first leg 16, and also a space 20*b* is formed between the second mounting portion 17 and the second leg 18. The first mounting portion 15 is held by the first leg 16 inclined with respect to the first leg 16, and the second mounting portion 17 is held by the second leg 18 inclined with respect to the second leg 18.

That is, the first mounting portion 15 is held by the first leg 16 so the first tip 1 faces inward with respect to the extending direction of the first leg. Further, the second mounting portion 17 is held by the second leg 18 so that the second tip 2 faces inward with respect to the extending direction of the second leg 18.

The first mounting portion 15 is held by the first leg 16 and the first housing 12*a* via the first connecting portion 25. The second mounting portion 17 is held by the second leg 18 and the second housing 12*b* via the second connecting portion 26.

The first mounting portion 15 is arranged in the space defined by the first housing 12*a* and the first leg 16, and the second mounting portion 17 is arranged in the space defined by the second housing 12*b* and the second leg 18. On the other hand, the first connecting portion 25 is arranged so it will expose at the distal end of the first housing 12*a* (upper end in FIG. 2), and the second connecting portion 26 is arranged so it will expose at the distal end of the second housing 12*b* (upper end in FIG. 2)(See FIG. 1). However, the first leg 16 may be arranged so it will be covered by the first housing 12*a*, and the second leg 18 may be arranged so it will be covered by the second housing 12*b*.

The first connecting portion 25 is held sandwiched between the distal end (the upper end in FIG. 2) of the first leg 16 and the first housing 12*a*. However, the first connecting portion 25 is not limited to the configuration positioned at the distal end of the first leg 16, and for example, may be arranged at an intermediate position of the first leg 16.

Figure 3:
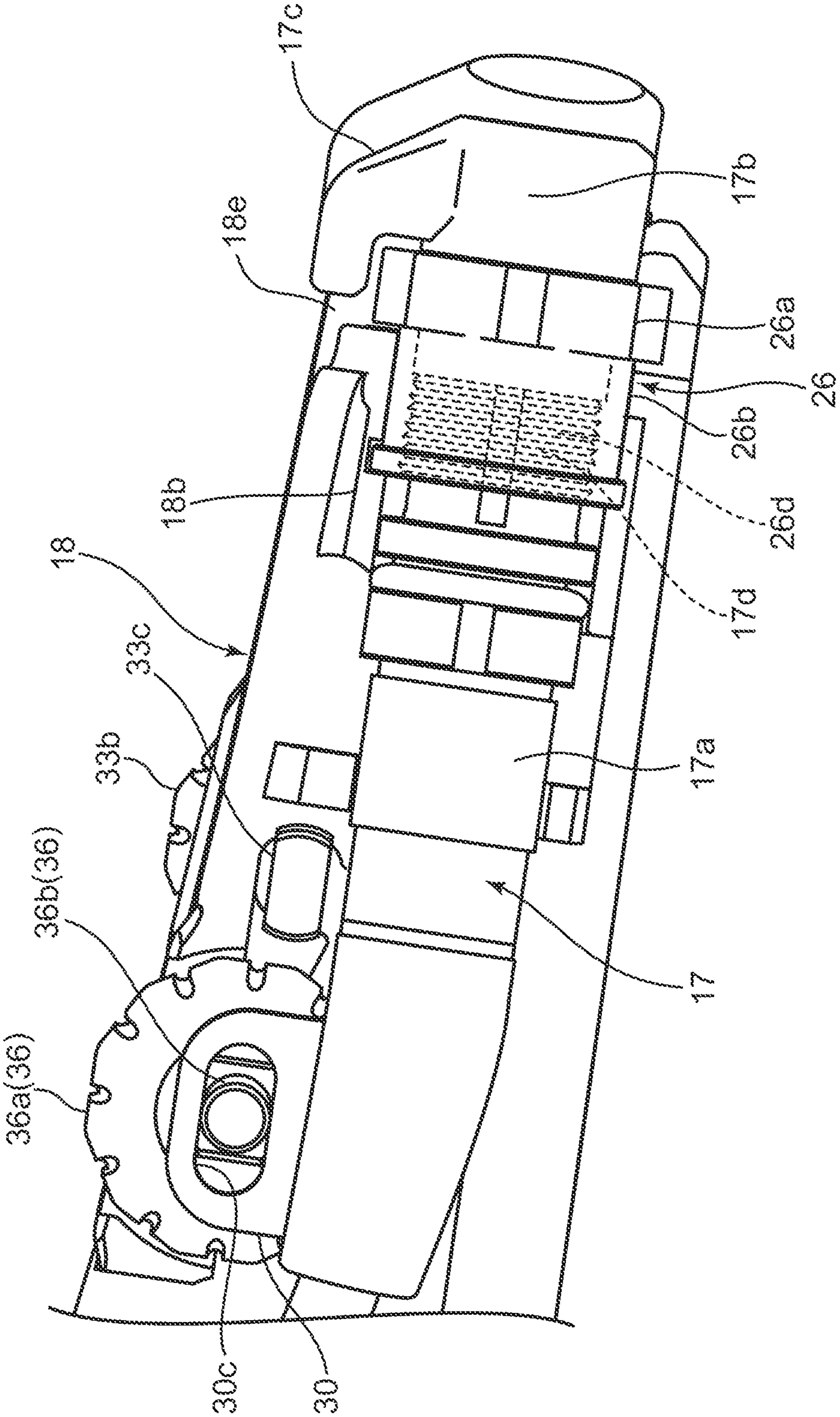
FIG. 3 is a view showing a part of the tweezers device, seen from the side of the second leg.

The first mounting portion 15 and the second mounting portion 17 has same configuration, and also the first connecting portion 25 and the second connecting portion 26 has the same configuration. Since FIG. 3 shows the second mounting portion 17 and the second connection portion 26, here, with reference to FIG. 3, the configurations of the second mounting portion 17 and the second connecting portion 26 will be described.

The second connecting portion 26 is formed by an annular member, so the second mounting portion 17 is inserted. The second connecting portion 26 has a knob 26*a* with plurality of convex arranged in the circumferential direction, and a cylindrical portion 26*b* on the proximal side of the knobs 26*a*. The cylindrical portion 26*b* is positioned inside the second housing 12*b*, and is rotatably held between a second holding portion 18*b* of the second leg 18 and the second housing 12*b*. On the other hand, the knob 26*a* is exposed outside of the second housing 12*b* and is used to rotate the second connecting portion 26.

The second mounting portion 17 has a base portion 17*a*, and a top portion 17*b* that is formed separately from the base portion 17*a* and is located on the distal side of the base portion 17*a*.

The second tip 2 is inserted through the top portion 17*b* into the base portion 17*a*, and is supported by the base portion 17*a*. The top portion 17*b* is connected to the base portion 17*a* inside the second connecting portion 26, and is rotatable with respect to the base portion 17*a*. When the top portion 17*b* is rotated with respect to the base portion 17*a*, it is configured that the second tip 2 held by the base portion 17*a* will rotate.

A protrusion 17*c* is provided on the top portion 17*b*, and the protrusion 17*c* can engage with the convex stopper 18*e* formed on the second leg 18 when the top portion 17*b* is rotated. As a result, the rotation range of the top portion 17*b*, that is, the rotation range of the second tip 2 is regulated.

A female screw 26*d* is provided on the inner surface of the cylindrical portion 26*b* of the second connecting portion 26. On the other hand, a male screw 17*d* is provided on the outer surface of the tip of the base portion 17*a* of the second mounting portion 17, and the male screw 17*d* is screwed into the female screw 26*d* of the second connecting portion 26. Therefore, when the knob 26*a* of the second connecting portion 26 is rotated, the second mounting portion 17 is displaced with respect to the second connecting portion 26 in a front-rear direction (vertical direction in FIG. 2). As a result, the second tip 2 attached to the second mounting portion 17 can be displaced in the front-rear direction.

Since the first connecting portion 25 is also configured in the same manner as the second connecting portion 26, the first tip 1 attached to the first mounting portion 15 may be displaced in the front-rear direction, and also the first tip 1 may be rotated. Therefore, the relative position between the ends of the first tip 1 and the second tip 2 in the front-rear direction can be adjusted.

Returning to FIG. 2, as shown, the first leg 16 and the second leg 18 are connected to the rotating shaft 19 at the proximal end (lower end in FIG. 2). The first leg 16 and the second leg 18 are each provided with a through hole which the rotating shaft 19 penetrates through. The first leg 16 is formed in a shape extending in one direction from the hole toward its distal end, and the second leg 18 is formed in a shape extending in one direction from the hole toward its distal end. At the distal end of the first leg 16, a first holding portion 16*b* is formed for holding the cylindrical portion 25*b* of the first connecting portion 25 together with the first housing 12*a*. Likely, at the distal end of the second leg 18, a second holding portion 18*b* is formed for holding the cylindrical portion 26*b* of the second connecting portion 26 together with the second housing 12*b*. The first leg 16 and the second leg 18 are made of resin.

On the first leg 16, a block base 16*c* is provided at the proximal side of the hole. The power supply line 21 is arranged above of the base 16*c*. Further, a leaf spring 30 is fixed to the base 16*c*.

The leaf spring 30 works as a bias member to bias the first leg 16 and the second leg 18, in a direction so the first distal end 16*d* of the first leg 16 and the second distal end 18*d* of the second leg 18 are pushed away from each other. The leaf spring 30 extends from the base 16*c* of the first leg 16 to the second leg 18, along the outer surfaces of the first leg 16 and the second leg 18. The leaf spring 30 has a first end 30*a* engaged to the first leg 16 and a second end 30*b* engaged to the second leg 18.

The first end 30*a* of the leaf spring 30 is fixed to a side surface 16*e* of the base 16*c*, where the side surface 16*e* extends in a longitudinal direction (vertical direction in FIG. 2). When the virtual line of the side surface 16*e* is extended, it will be orthogonal to or substantially orthogonal to a shaft member 33*a* described later. The flat surface of the leaf spring 30 contacts the side surface 16*e* of the base 16*c*, and extends distally. Therefore, when the position of the second end 30*b* of the leaf spring 30 is displaced by elastic deformation and urged toward the second leg 18 with respect to the virtually extended surface of the side surface 16*e* of the base 16*c*, a bias force is generated in the direction in where the first distal end 16*d* of the first leg 16 and the second distal end 18*d* of the second leg 18 are pushed away from each other. Therefore, when first tip 1 and second tip 2 are pushed close to each other in operation, a restoring force is generated in the leaf spring 30.

The leaf spring 30 urges the first distal end 16*d* of the first leg 16 and the second distal end 18*d* of the second leg 18 to move away from each other. The acceptable opening width between 16*d* and 18*d* may be regulated by the width adjusting wheel 33*b* and the stopper 33*c*, which will be described later.

The tweezers device 10 is provided with an open width adjusting means 33 for adjusting the allowable open width between the first distal end 16*d* and the second distal end 18*d*.

Specifically, the open width adjusting means 33 includes a shaft 33*a* bridged between the first leg 16 and the second leg 18, a width adjusting wheel 33*b* for performing the adjustment of allowable width, a stopper 33*c* to regulate the open width between the first leg 16 and the second leg 18 together with the width adjusting wheel 33*b*, and a displacement means 33*d* to change the position of the width adjusting wheel 33*b* against the shaft 33*a*.

The shaft member 33*a* has one end inserted into a through hole formed in the first leg 16 and the other end inserted into a through hole formed in the second leg 18. The axial center of the shaft 33*a* extends in a direction along the opening direction of the first distal end 16*d* and the second distal end 18*d*. The direction of this axial center is orthogonal to the rotation shaft 19. In the present embodiment, the shaft 33*a* is inserted through the through hole so as not to rotate around the axis. For example, the shaft member 33*a* has a non-circular cross section instead of a circular cross section to avoid rotation.

The width adjusting wheel 33*b* and the stopper 33*c* are arranged to sandwich the first leg 16 and the second leg 18. That is, the width adjusting wheel 33*b* is provided on the opposite side of the second leg 18 with respect to the first leg 16, and the stopper is provided on the opposite side of the first leg 16 with respect to the second leg 18.

The stopper 33*c* is provided at the end of the shaft 33*a*, has a width larger than the shaft 33*a*, and is formed in a size that will not go through the through hole. Therefore, the shaft 33*a* will not come off from the through hole of the second leg 18. Here, the stopper 33*c* is formed integrally with the shaft 33*a*, however, it may be formed separately from the shaft 33*a* and then fixed to the shaft 33*a*.

With the shaft 33*a*, the displacement means 33*d* includes a male screw 33*e* formed on the end opposite to the end where the stopper 33*c* is provided, and a female screw 33*f* provided on the inner surface of the width adjusting wheel 33*b*, the width adjusting wheel 33*b* formed annular and to fit on the shaft 33*a*. Therefore, when the width adjusting wheel 33*b* is rotated with respect to the shaft 33*a*, the width adjusting wheel displaces in the direction of the axial center of the shaft 33*a*, which will change the width of the width adjusting wheel 33*b* and the stopper 33*c*. As a result, the acceptable opening width of the first leg 16 and the second leg 18 are adjusted. In the embodiment, this acceptable opening width can be minimized until the first tip 1 and the second tip 2 comes into contact with each other. The female screw 33*f* on the inner surface of the width adjusting wheel 33*b* may be formed as a nut embedded in the width adjusting wheel.

The width adjusting wheel 33*b* is provided in the wheel holding portion (first wheel holding portion) 16*f* formed on the first leg 16, and is rotatably held in position by the first wheel holding portion and the first housing 12*a*.

The first wheel holding portion 16*f* is located at an intermediate portion between the first distal end 16*d* and the base end (hole that supports the rotating shaft 19) of the first leg 16, and is located outside the first leg 16 (opposite side of the second leg 18), and is integrally formed with the first leg 16. Therefore, the width adjusting wheel 33*b* is arranged on the distal side of the rotating shaft 19. In other words, the width adjusting wheel 33*b* is arranged at positions closer to the first distal end 16*d* and the second distal end 18*d* than the rotating shaft 19.

The first wheel holding portion 16*f* has an inner peripheral surface matching the outer peripheral surface of the width adjusting wheel 33*b*, and the first housing 12*a* is adjacent to the first wheel holding portion 16*f*. Therefore, the width adjusting wheel 33*b* is held in place so as not to get away from the first wheel holding portion 16*f*. That is, the width adjusting wheel 33*b* is held in place with the first leg 16. Therefore, even if the position of the width adjusting wheel 33*b* with respect to the shaft 33*a* is displaced, the position of the width adjusting wheel 33*b* with respect to the first leg 16 does not change. Meanwhile, when the first tip 1 and the second tip 2 are operated to bring close to each other (not the adjustment of the opening width but the closing operation for pinching the electronic component), the first leg will not go away from the width adjusting wheel 33*b*, but the second leg 18 will separate away from the stopper 33*c*.

The width adjusting wheel 33*b* is arranged in the space 20*a* between the first leg 16 and the first mounting portion 15.

The tweezers device 10 further includes an adjusting member 36 which adjust the relative position between the first distal end 16*d* of the first leg 16 and the second distal end 18*d* of the second leg 18 in the extending direction of the rotating shaft 19. The adjusting member 36 adjusts the relative position of the first distal end 16*d* and the second distal end 18*d* in a direction orthogonal to the virtual plane formed by the movement trace of the first leg 16 and the second leg 18 (i.e. direction orthogonal to the paper surface of FIG. 2).

Figure 4:
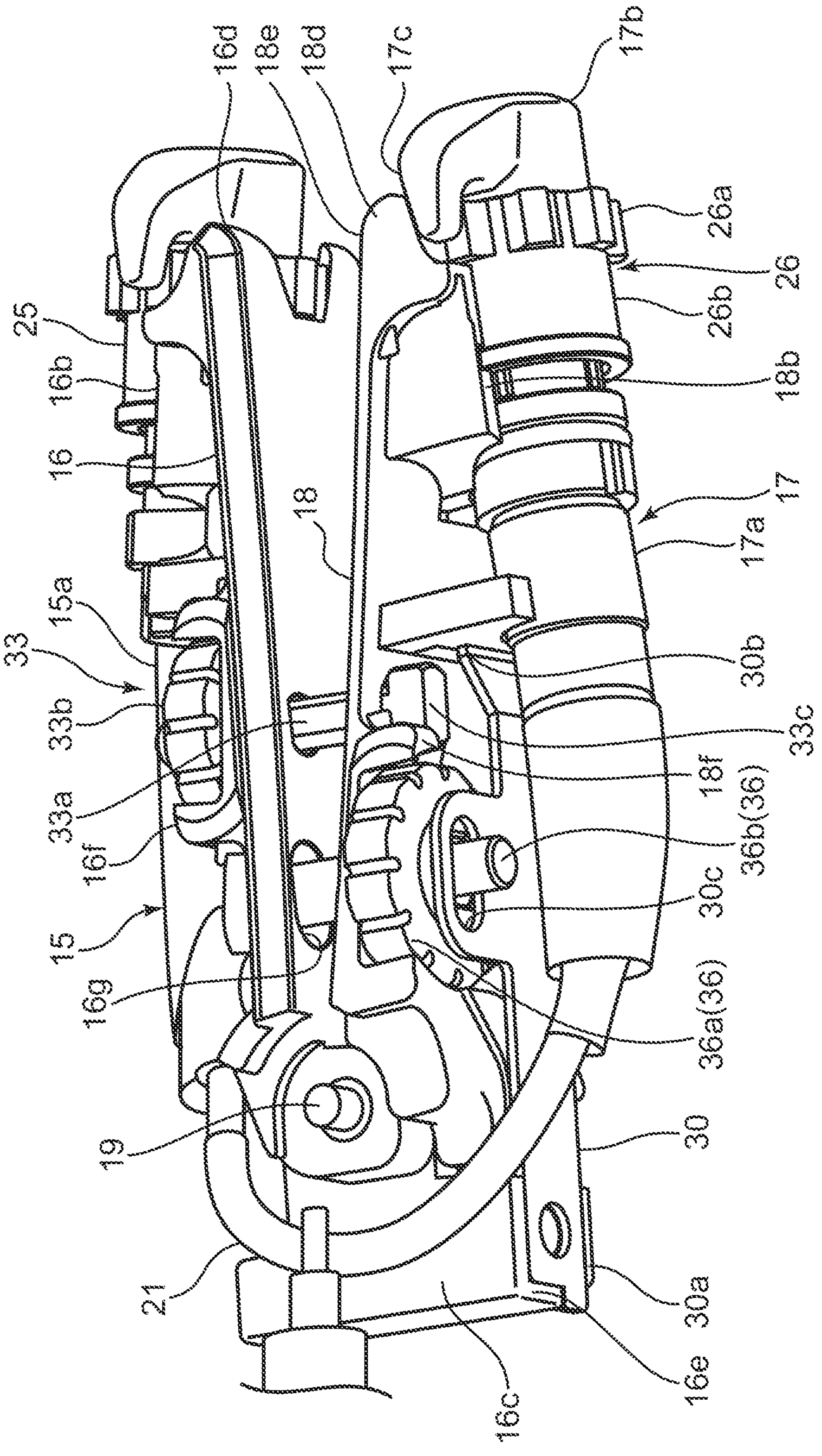
FIG. 4 is a perspective view showing the tweezers device with the housing removed.

The adjusting member 36 includes a position adjusting wheel 36*a* and an eccentric shaft 36*b*. As shown in FIG. 4, the position adjusting wheel 36*a* is rotatably held by the second wheel holding portion 18*f* provided on the second leg 18, and is arranged at a position in the distal side than the rotating shaft 19. In other words, the position adjusting wheel 36*a* is arranged at position closer to the first distal end 16*d* and the second distal end 18*d* than the rotation shaft 19. The second wheel holding portion 18*f* is provided on the surface of the second leg 18 opposite to the first leg 16. The second wheel holding portion 18*f* is arranged at a position closer to the rotation shaft 19 than the first wheel holding portion 16*f*. That is, the first wheel holding portion 16*f* and the second wheel holding portion 18*f* are arranged at positions shifted in the front-rear direction. Therefore, the width adjusting wheel 33*b* and the position adjusting wheel 36*a* are also shifted in the front-rear direction. However, the width adjusting wheel 33*b* and the position adjusting wheel 36*a* may be arranged to partially overlap when seen from a side view (viewed from the extending direction of the shaft member 33*a*). Therefore, it is possible to prevent the first leg 16 and the second leg 18 from becoming too long or big in the front-rear direction to arrange the wheels 33*b* and 36*a*.

The eccentric shaft 36*b* is bridged between the first leg 16 and the leaf spring 30. Therefore, the position adjusting wheel 36*a* is prevented from tilting. Further, the eccentric shaft 36*b* is arranged parallel with the shaft 33*a*. Therefore, the width adjusting wheel 33*b* and the position adjusting wheel 36*a* can rotate around an axis parallel to each other. This will allow both wheels 33*b* and 36*a* to be operated in the same direction.

The eccentric shaft 36*b* is fixed to the position adjusting wheel 36*a* eccentric from the center of the position adjusting wheel 36*a*. The eccentric shaft 36*b* is inserted into the elongated hole 16*g* (see FIG. 4) formed on the first leg 16, and into the elongated hole 30*c* (see FIG. 3) formed in the leaf spring 30.

The elongated hole 16*g* and the elongated hole 30*c* have lengths that cover the range in which the eccentric shaft 36*b* revolves. Therefore, when the eccentric shaft 36*b* revolves by the position adjusting wheel 36*a* being rotated, the eccentric shaft 36*b* will show reciprocate movement in the elongated hole 16*g* and the elongated hole 30*c*.

When the eccentric shaft 36*b* revolves, the first leg 16 will cause a swing movement having the connecting portion of the rotating shaft 19 as the center, so the first distal end 16*d* will displace with respect to the second distal end 18*d* in the extending direction of the rotating shaft 19. Accompanied by this swing movement, the relative position of the first distal end 16*d* of the first leg 16 and the second distal end 18*d* of the second leg 18 will change in direction of the rotating shaft 19. The connecting portion between the second leg 18 and the first leg 16 has some play that will allow this swing movement. Since the first end 30*a* of the leaf spring 30 is coupled to the base 16*c* of the first leg 16, by the revolution of the eccentric shaft 36*b*, the leaf spring 30 will swing around the connection portion of the rotating shaft 19 as the center.

As shown in FIG. 1, the width adjusting wheel 33*b* and the position adjusting wheel 36*a* are exposed from the housing 12 in the same direction. That is, the housing 12 has a pair of surfaces (upper surface and lower surface in FIG. 1) facing opposite to each other, and the both of the width adjusting wheel 33*b* and the position adjusting wheel 36*a* are exposed from only one of the surface (upper surface in FIG. 1). The pair of surfaces face opposite to each other in the extending direction of the rotation shaft 19.

The width adjusting wheel 33*b* expose from the first housing 12*a*, and the position adjusting wheel 36*a* expose from the second housing 12*b*. That is, the width adjusting wheel 33*b* is arranged on the first housing 12*a* side partially exposed, and the position adjusting wheel 36*a* is arranged on the second housing 12*b* side partially exposed. Since the width adjusting wheel 33*b* and the position adjusting wheel 36*a* are separately arranged in the first housing 12*a* and the second housing 12*b*, it is easy to distinguish the two wheels 33*b* and 36*a* when the tweezers device 10 is used, which avoids the wheels being mistakenly operated.

As described above, in the present embodiment, the width adjusting wheel 33*b* for adjusting the acceptable opening width between the first distal end 16*d* of the first leg 16 and the second distal end 18*d* of the second leg 18 is provided at a distal position (toward first distal end 16*d* and second distal end 18*d*) than the rotation shaft 19.

Therefore, when holding the tweezers device 10, the thumb of the hand holding the first leg 16 and the second leg 18 can touch the width adjusting wheel 33*b*. Moreover, the shaft 33*a* extends in a direction parallel to the direction connecting the first distal end 16*d* and the second distal end 18*d*. Therefore, it is easy to rotate the width adjusting wheel 33*b* in the direction which the thumb will move while the hand holding the first leg 16 and the second leg 18. That is, it is easy to operate the width adjusting wheel 33*b* with the hand holding the tweezers device 10. Therefore, the acceptable opening width between the ends 16*d* and 18*d* of the pair of legs 16 and 18 can be easily adjusted. Further, since the width adjusting wheel 33*b* is located on the distal side than the rotating shaft 19, the tweezers device 10 does not become large.

Further, in the present embodiment, the acceptable opening width can be adjusted until the first tip 1 and the second tip 2 come into contact with each other, so a very small electronic component may be pinched by the soldering device 5. Further, when the first tip 1 and the second tip 2 are used in contact with each other, it can also be used as a soldering iron having double heat capacity.

Further, in the present embodiment, since the width adjusting wheel 33*b* is held by the first wheel holding portion 16*f* of the first leg 16, it is possible to rotate the width adjusting wheel 33*b* without providing a support of the shaft 33*a* on the first leg 16. Further, since the width adjusting wheel 33*b* is hold in place in the first leg 16, when the operation of pinching/closing the legs 16 and 18 is performed, the width adjusting wheel 33*b* moves together with the first leg 16. Therefore, it is possible to avoid the width adjusting wheel 33*b* falling off from the first leg 16. When the legs 16*d* and 18*d* are closed/pinched, even the width adjusting wheel 33*b* is held in place together with the first leg 16, the operation of closing the legs 16 and 18 is not hindered since the stopper 33*c* will be pushed away from the second leg 18.

Further, in the present embodiment, the width adjusting wheel 33*b* is arranged in the space 20*a* between the first mounting portion 15 and the first leg 16. That is, the width adjusting wheel 33*b* is arranged in the space between the components required for the tweezers device 10. Therefore, it is possible to prevent the tweezers device 10 from becoming large in size.

Further, in the present embodiment, a leaf spring 30 is used to urge the first leg 16 and the second leg 18 away, and the leaf spring 30 is provided along the first leg 16 or the second leg 18. Therefore, the bias member that urge the legs 16 and 18 can be made inconspicuous or hided.

Further, in the present embodiment, by rotating the position adjusting wheel 36*a*, the eccentric shaft 36*b* revolves and the relative position of the center of the position adjusting wheel 36*a* with respect to the leaf spring 30 changes. As a result, the relative position between the first distal end 16*d* and the second distal end 18*d* in the extending direction of the rotation shaft 19 changes. Therefore, this function can deal in cases when it is desired to arrange the second distal end 18*d* at a position slightly deviated from the first distal end 16*d* in the rotation shaft 19 direction, or when the first distal end 16*d* and the second distal end 18*d* are slightly deviated in the rotation shaft 19 direction and needs to be aligned. Moreover, the position adjustment between the first distal end 16*d* and the second distal end 18*d* can be performed with a simple configuration in which the eccentric shaft 36*b* of the position adjusting wheel 36*a* is inserted through the elongated hole 30*c* formed in the leaf spring 30.

Further, the acceptable opening width and the position adjustment between the first distal end 16*d* and the second distal end 18*d* in the rotation shaft 19 direction is adjusted by rotating the wheels 33*b* and 36*a*, respectively. Therefore, the tweezers device 10 can perform two types of adjustment operations, and each of the adjustment operation can be easily performed.

Further, in the present embodiment, the width adjusting wheel 33*b* and the position adjusting wheel 36*a* are exposed from the housing 12 in the same direction, so the two adjustments (adjustment of acceptable opening width and the position adjustment between the first distal end 16*d* and the second distal end 18*d* in the rotating shaft 19 direction) may be accessed from the same side with respect to the housing 12. This allows the adjustment to be performed without changing the orientation of the housing 12.

Figure 5:
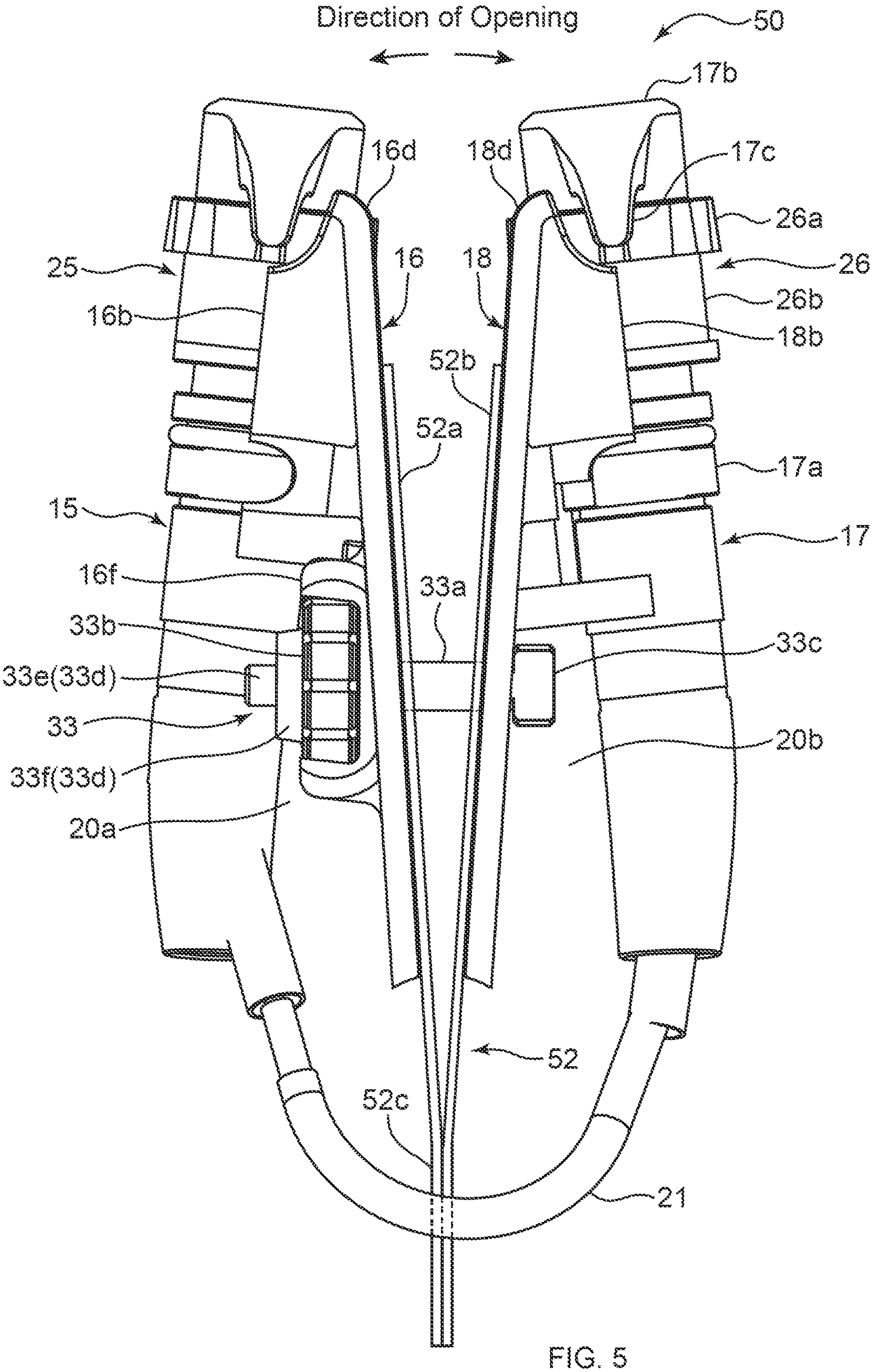
FIG. 5 is a view showing a tweezers device according to a second embodiment with the housing removed.

FIG. 5 shows the tweezers device 50 according to the second embodiment. In FIG. 5, the tweezers device 50 is shown with the first housing 12*a* and the second housing 12*b* removed. Here, the same components as those in the first embodiment are indicated by the same reference numerals, and detailed description thereof will be omitted.

In the first embodiment, a rotation shaft 19 for rotatably connecting the first leg 16 and the second leg 18 is provided. On the other hand, in the tweezers device 50 of the second embodiment, the first leg 16 and the second leg 18 can be closed/pinched without the rotating shaft 19 being provided.

Specifically, the tweezers device 50 includes a bias member 52 having a first bias portion 52*a* and a second bias portion 52*b*. The bias member 52 has a connecting portion 52*c* that connects the proximal end of the first bias portion 52*a* and the proximal end of the second bias portion 52*b*. The bias member 52 is biased in a direction which the distal end of the first bias portion 52*a* and the distal end of the second bias portion 52*b* are pushed away from each other (opening direction). The first leg 16 is fixed to the first bias portion 52*a* on the distal side than the connecting portion 52*c*, and the second leg 18 is fixed to the second bias portion 52*b* on the distal side than the connecting portion 52*c*.

The bias member 52 has an elastic force in a direction in which the first distal end 16*d* of the first leg 16 and the second distal end 18*d* of the second leg 18 are pushed away from each other. The acceptable opening width of the first leg 16 (or the first bias portion 52*a*) and the second leg 18 (or the second bias portion 52*b*) is adjusted by the width adjusting wheel 33*b* and the stopper 33*c*.

The width adjusting wheel 33*b* is positioned close to the first distal end 16*d* and the second distal end 18*d* than the connecting portion 52*c* of the end of the first bias member 52*a* and the end of the second bias member 52*b*. The axial center of the width adjusting wheel 33*b*, that is, the axial center of the shaft 33*a* is along with the opening direction of the first distal end 16*d* and the second distal end 18*d*.

Therefore, in the second embodiment, the width adjusting wheel 33*b* for adjusting the acceptable opening width between the first distal end 16*d* of the first leg 16 and the second distal end 18*d* of the second leg 18 is arranged at a position closer to the first distal end 16*d* and the second distal end 18*d* than the connecting portion 52*c* of the first bias portion 52*a* and the second bias portion 52*b*. Therefore, the hand holding the tweezers device 50 can touch the width adjusting wheel 33*b* with its thumb. Moreover, the axial center of the width adjusting wheel 33*b* extends in the direction along the opening direction of the first distal end 16*d* and the second distal end 18*d*. Therefore, it is easy to rotate the width adjusting wheel 33*b* in the direction in which the thumb of the hand holding the tweezers device 50 can be moved. That is, it is easy to operate the width adjusting wheel 33*b* with the hand holding the tweezers device 50. Therefore, the acceptable opening width between the ends 16*d* and 18*b* of the pair of legs 16 and 18 can be easily adjusted. Further, since the width adjusting wheel 50 is located on the distal side than the connecting portion 52*c*, the tweezers device 50 does not become large.

Figure 6:
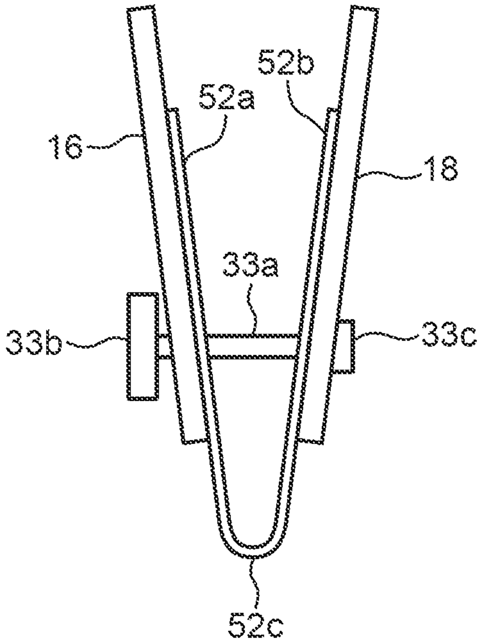
FIG. 6 is a view of a modification of a biasing member provided in the tweezers device according to the second embodiment.
Figure 7:
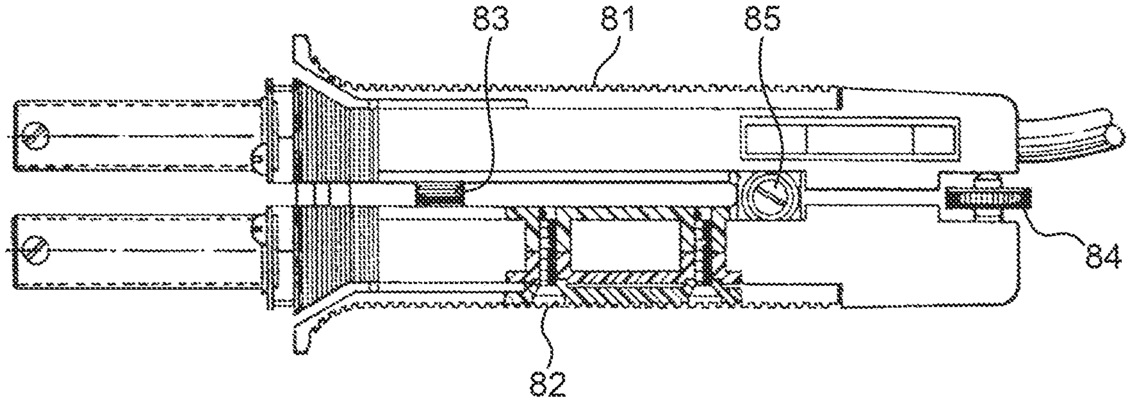
FIG. 7 PRIOR ART
FIG. 7 is a view of a conventional tweezers device.

In the bias member 52 shown in FIG. 5, the connecting portion 52*c* is configured that the surface of the first bias portion 52*a* and the second bias portion 52*b* is fixed together. However, it is not limited to this and for example, as shown in FIG. 6, the connecting portion 52*c* may have a configuration in which the end of the first bias portion 52*a* and the end of the second bias portion 52*b* are connected in series so as to have a continuous curved shape.

Although the description of other configurations, actions, and effects will be omitted, the description of the first embodiment can be incorporated into the second embodiment.

It should be noted that the embodiments disclosed are exemplary in all respects and are not considered to be restrictive. The present invention is not limited to the embodiment described above, and various modifications and improvements can be made without departing from the spirit of the present invention. For example, in the first and second embodiments, the acceptable opening width is adjusted by rotating the female screw **33*f* of the width adjusting wheel 33*b* with respect to the male screw 33*e* of the shaft 33*a*, but the configuration is not limited to this. For example, the width adjusting wheel 33*b* may be integrally formed with the shaft 33*a* so that the shaft 33*a* also rotates. In this case, the female screw 33*f* is fixed to the first leg 16 and this female screw 33*f* may screw with the male screw 33*e* of the shaft member 33*a***.

Further, when the width adjusting wheel **33*b* is provided integrally with the shaft member 33*a*, the width adjusting wheel 33*b* may be allowed to be pushed away from the first leg 16. In this case, the stopper 33*c* may be provided with the female screw 33*f*, and the shaft 33*a* may be provided with the male screw 33*e*, which will screw with the female screw portion 33*f*. In this case, the stopper 33*c* will not be pushed away from the second leg 18**.

In the first and second embodiments, the width adjusting wheel **33*b* and the stopper 33*c* sandwich the first leg 16 and the second leg 18 from both sides, but the present invention is not limited to this. For example, the width adjusting wheel 33*b* may be arranged between the first leg 16 and the second leg 18, while the shaft 33*a* being provided with a female screw (not shown) at the end opposite to the stopper 33*c*, and the first leg 16 and the second leg 18 may be sandwiched from both sides by this female screw and the stopper 33*c***.

In the first embodiment, the base **16*c* which the leaf spring 30 is engaged is provided on the first leg 16, but the base which the leaf spring 30 is engaged may be provided on the second leg 18 instead of the first leg 16, in the position where the base 16*c* is provided in FIG. 2. In this case, the second end 30*b* of the leaf spring 30 may be engaged to the base of the second leg 18, and the first end 30*a* of the leaf spring 30 engaged to the first leg 16 will position to the distal side than the base of the second leg 18. That is, the front-rear relationship between the first end portion 30*a* and the second end portion 30*b* is opposite to that of the first embodiment, and the leaf spring 30 extends in a direction along the base of the second leg 18 to the first leg 16**.

In the first embodiment, the leaf spring 30 is formed in a shape extending in one direction from the base **16*c* of the first leg 16 along the second leg 18, but is not limited to this configuration. For example, the leaf spring 30 may be formed in a U shape and arranged along the first leg 16 and the second leg 18. That is, the leaf spring 30 will have a configuration including a first portion located outside the first leg 16, a second portion located outside the second leg 18, and a connecting portion to connect the end of the first portion and the second portion. In this case, the leaf spring 30 may be arranged along the outer surface of the first leg 16 and the second leg 18**, or may be arranged along the inner surface.

Further, in the first embodiment, the leaf spring 30 is used as the bias member for biasing the first leg 16 and the second leg 18, but a coil spring may be used instead of the leaf spring 30. In this case, the coil spring will be arranged between the first leg 16 and the second leg 18 in a compressed state.

In the first and second embodiments, the connecting portions 25 and 26 are provided, and the first connecting portion 25 is configured so the first mounting portion 15 can be displaced in the front-rear direction with respect to the first leg 16, but is not limited to this configuration. For example, the first connecting portion 25 may be configured so the first mounting portion 15 will not move. Further, the first connection portion 25 may be omitted. In this case, the first mounting portion 15 will be held by the first leg 16 and the first housing **12*a* without moving in front-rear direction. The second connection portion 26** can also be omitted in the same manner.

The first mounting portion 15 rotatably holds the first tip 1, but is not limited to this configuration. The first mounting portion 15 may be configured to hold the first tip 1 so it will not rotate. This is same with the second mounting portion 17.

In the above embodiment, the width adjusting wheel **33*b* is arranged in the space 20*a* between the first mounting portion 15 and the first leg 16, but is not limited to this configuration. The width adjusting wheel 33*b* may be arranged at a position overlapping the first mounting portion 15**.

In the first embodiment, an adjusting member 36 for adjusting the position between the first tip 1 and the second tip 2 in the direction of the rotation shaft 19 is provided, but the adjusting member 36 may be omitted. Further, the adjusting member 36 may be configured to adjust the position without using the leaf spring 30.

The width adjusting wheel **33*b* and the position adjusting wheel 36*a* may be exposed from the housing 12 in different directions. Further, the width adjusting wheel 33*b* and the position adjusting wheel 36*a* may both be arranged in the first housing 12*a***.

EXPLANATION OF SYMBOLS

1: first tip
2: Second tip
10: Tweezers device
12: Housing
**12*a***: First housing
**12*b***: Second housing
15: First mounting portion
16: First leg
**16*d***: First distal end
**16*f***: First wheel holding portion
17: Second mounting portion
18: Second leg
**18*d***: Second tip
19: Rotating shaft
**20*a***: Space
30: Leaf spring
**30*a***: First end
**30*b***: Second end
**30*c***: Elongated hole
33: Open width adjusting means
**33*b***: Width adjustment wheel
**33*c***: Stopper
36: Adjusting member
**36*a***: Position adjustment wheel
**36*b***: Eccentric shaft
50: Tweezers device
52: Bias member
**52*a***: first bias portion
**52*b***: second bias portion

The invention claimed is:

1. A tweezers device comprising:
a first mounting portion for attaching a first tip,
a first leg to hold said first mounting portion,
a second mounting portion for attaching a second tip,
a second leg to hold said second mounting portion,
a rotating shaft to rotatably connect said first leg and said second leg, a bias member to bias said first leg and said second leg in a rotating direction of said rotating shaft, working to push away a distal end of said first leg and a distal end of said second leg, and an open width adjustment member including a rotatable width adjustment wheel, wherein an acceptable opening width between said distal end of said first leg and said distal end of said second end is adjusted by the rotation of said width adjustment wheel, wherein said width adjustment wheel is positioned distally closer towards said distal end of said first leg and said distal end of said second leg than said rotating shaft, and is rotatable on an axis along an opening direction of said distal end of said first leg and said distal end of said second leg, and, wherein said bias member includes a leaf spring having a first end engaged to said first leg and a second end engaged to said second leg.

2. The tweezers device according to claim 1, further comprising an adjusting member to adjust a position between said distal end of said first leg and said distal end of said second leg in a direction of said rotating shaft, said adjusting member including a position adjusting wheel rotatable in a position distal to said rotating shaft, and an eccentric shaft provided in a position eccentric from a center of said position adjusting wheel, wherein, said leaf spring comprises an elongated hole, and wherein said eccentric shaft of said position adjusting wheel is inserted into said elongated hole, and by the rotation of said position adjusting wheel, the relative position between said distal end of said first leg and said distal end of said second leg is changed in the direction orthogonal to the opening direction of said distal end of said first leg and said distal end of said second leg.

3. A tweezers device comprising:

a first mounting portion for attaching a first tip, a first leg to hold said first mounting portion, a second mounting portion for attaching a second tip, a second leg to hold said second mounting portion, a rotating shaft to rotatably connect said first leg and said second leg, a bias member to bias said first leg and said second leg in a rotating direction of said rotating shaft, working to push away a distal end of said first leg and a distal end of said second leg, and an open width adjustment member including a rotatable width adjustment wheel, wherein an acceptable opening width between said distal end of said first leg and said distal end of said second end is adjusted by the rotation of said width adjustment wheel, wherein said width adjustment wheel is positioned distally closer towards said distal end of said first leg and said distal end of said second leg than said rotating shaft, and is rotatable on an axis along an opening direction of said distal end of said first leg and said distal end of said second leg, said width adjustment wheel is positioned next to said first leg on the opposing side of said second leg, said open width adjusting member includes a stopper which is positioned next to said second leg on the opposing side of said first leg where a distance between said width adjustment wheel and said stopper changes by the rotation of said width adjustment wheel, and said acceptable opening width is defined by said stopper and said width adjustment wheel.

4. A tweezers device comprising:

a first mounting portion for attaching a first tip, a first leg to hold said first mounting portion, a second mounting portion for attaching a second tip, a second leg to hold said second mounting portion, a rotating shaft to rotatably connect said first leg and said second leg, a bias member to bias said first leg and said second leg in a rotating direction of said rotating shaft, working to push away a distal end of said first leg and a distal end of said second leg, and an open width adjustment member including a rotatable width adjustment wheel, wherein an acceptable opening width between said distal end of said first leg and said distal end of said second end is adjusted by the rotation of said width adjustment wheel, wherein said width adjustment wheel is positioned distally closer towards said distal end of said first leg and said distal end of said second leg than said rotating shaft, and is rotatable on an axis along an opening direction of said distal end of said first leg and said distal end of said second leg, and wherein said acceptable opening width is adjustable to allow said first tip and said second tip to come into contact.

5. A tweezers device comprising:

a first mounting portion for attaching a first tip, a first leg to hold said first mounting portion, a second mounting portion for attaching a second tip, a second leg to hold said second mounting portion, a rotating shaft to rotatably connect said first leg and said second leg, a bias member to bias said first leg and said second leg in a rotating direction of said rotating shaft, working to push away a distal end of said first leg and a distal end of said second leg, and an open width adjustment member including a rotatable width adjustment wheel, wherein an acceptable opening width between said distal end of said first leg and said distal end of said second end is adjusted by the rotation of said width adjustment wheel, wherein said width adjustment wheel is positioned distally closer towards said distal end of said first leg and said distal end of said second leg than said rotating shaft, and is rotatable on an axis along an opening direction of said distal end of said first leg and said distal end of said second leg, and wherein said width adjusting wheel is rotatably held in place so that it will not be pushed away from said first leg.

6. A tweezers device comprising:

a first mounting portion for attaching a first tip, a first leg to hold said first mounting portion, a second mounting portion for attaching a second tip, a second leg to hold said second mounting portion, a rotating shaft to rotatably connect said first leg and said second leg, a bias member to bias said first leg and said second leg in a rotating direction of said rotating shaft, working to push away a distal end of said first leg and a distal end of said second leg, and an open width adjustment member including a rotatable width adjustment wheel, wherein an acceptable opening width between said distal end of said first leg and said distal end of said second end is adjusted by the rotation of said width adjustment wheel, wherein said width adjustment wheel is positioned distally closer towards said distal end of said first leg and said distal end of said second leg than said rotating shaft, and is rotatable on an axis along an opening direction of said distal end of said first leg and said distal end of said second leg, and wherein said first mounting portion is positioned on the opposing side of said second leg with respect to said first leg, and a space formed between said first leg and said first mounting portion, and said width adjusting wheel is arranged within said space.

7. A tweezers device comprising:

a first mounting portion for attaching a first tip, a first leg to hold said first mounting portion, a second mounting portion for attaching a second tip, a second leg to hold said second mounting portion, a rotating shaft to rotatably connect said first leg and said second leg, a bias member to bias said first leg and said second leg in a rotating direction of said rotating shaft, working to push away a distal end of said first leg and a distal end of said second leg, and an open width adjustment member including a rotatable width adjustment wheel, wherein an acceptable opening width between said distal end of said first leg and said distal end of said second end is adjusted by the rotation of said width adjustment wheel, wherein said width adjustment wheel is positioned distally closer towards said distal end of said first leg and said distal end of said second leg than said rotating shaft, and is rotatable on an axis along an opening direction of said distal end of said first leg and said distal end of said second leg, and further comprising a positon adjusting wheel, wherein by the rotation of said position adjusting wheel, the position between said distal end of the first leg and said distal end of the second leg is adjusted in a direction orthogonal to a virtual plane formed by a movement trace of said first leg and said second leg.

8. The tweezers device according to claim 7, wherein said width adjusting wheel and said position adjusting wheel are rotatable around axes parallel to each other.

9. The tweezers device according to claim 7, further comprising a housing which covers said first mounting portion and said second mounting portion, wherein said width adjustment wheel and said position adjustment wheel are exposed from said housing in the same direction.

10. The tweezers device according to claim 9, wherein said housing comprises a first housing which covers said first mounting portion, and a second housing which covers said second mounting portion, said width adjusting wheel is arranged in said first housing so a part of said width adjusting wheel is exposed from said first housing, and said positon adjusting wheel is arranged in said second housing so a part of said position adjusting wheel is exposed from said second housing.

11. The tweezers device according to claim 7, wherein said width adjusting wheel and said position adjusting wheel are arranged so as to partially overlap when seen from a side view.

12. A tweezers device, comprising:

a first mounting portion for attaching a first tip, a first leg to hold said first mounting portion, a second mounting portion for attaching a second tip, a second leg to hold said second mounting portion, a bias member having a first bias portion where said first mounting portion is fixed, and a second bias portion where said second mounting portion is fixed, said second bias portion connected with the first bias portion at a connection portion, wherein said bias member biases said first leg and said second leg in a direction to push away a distal end of said first leg and a distal end of said second leg from each other, and an open width adjusting member including a rotatable width adjustment wheel, wherein an acceptable opening width between said distal end of said first leg and said distal end of said second leg is adjusted by the rotation of said width adjustment wheel, wherein said width adjustment wheel is positioned distally closer towards said distal end of said first leg and said distal end of the second leg than the connecting portion of said first bias portion and said second bias portion, and is rotatable on an axis along an opening direction of said first distal end and said second distal end, said width adjustment wheel is positioned next to said first leg on the opposing side of said second leg, said open width adjusting member includes a stopper which is positioned at said second leg on the opposing side of said first leg where a distance between said width adjustment wheel and said stopper changes by the rotation of said width adjustment wheel, and said acceptable opening width is defined by said stopper and said width adjustment wheel.

13. A tweezers device, comprising:

a first mounting portion for attaching a first tip, a first leg to hold said first mounting portion, a second mounting portion for attaching a second tip, a second leg to hold said second mounting portion, a bias member having a first bias portion where said first mounting portion is fixed, and a second bias portion where said second mounting portion is fixed, said second bias portion connected with the first bias portion at a connection portion, wherein said bias member biases said first leg and said second leg in a direction to push away a distal end of said first leg and a distal end of said second leg from each other, and an open width adjusting member including a rotatable width adjustment wheel, wherein an acceptable opening width between said distal end of said first leg and said distal end of said second leg is adjusted by the rotation of said width adjustment wheel, wherein said width adjustment wheel is positioned distally closer towards said distal end of said first leg and said distal end of the second leg than the connecting portion of said first bias portion and said second bias portion, and is rotatable on an axis along an opening direction of said first distal end and said second distal end, and wherein said acceptable opening width is adjustable to allow said first tip and said second tip to come into contact.

14. A tweezers device, comprising:

a first mounting portion for attaching a first tip, a first leg to hold said first mounting portion, a second mounting portion for attaching a second tip, a second leg to hold said second mounting portion, a bias member having a first bias portion where said first mounting portion is fixed, and a second bias portion where said second mounting portion is fixed, said second bias portion connected with the first bias portion at a connection portion, wherein said bias member biases said first leg and said second leg in a direction to push away a distal end of said first leg and a distal end of said second leg from each other, and an open width adjusting member including a rotatable width adjustment wheel, wherein an acceptable opening width between said distal end of said first leg and said distal end of said second leg is adjusted by the rotation of said width adjustment wheel, wherein said width adjustment wheel is positioned distally closer towards said distal end of said first leg and said distal end of the second leg than the connecting portion of said first bias portion and said second bias portion, and is rotatable on an axis along an opening direction of said first distal end and said second distal end, and wherein said width adjusting wheel is rotatably held in place so that it will not be pushed away from said first leg.

15. A tweezers device, comprising:

a first mounting portion for attaching a first tip, a first leg to hold said first mounting portion, a second mounting portion for attaching a second tip, a second leg to hold said second mounting portion, a bias member having a first bias portion where said first mounting portion is fixed, and a second bias portion where said second mounting portion is fixed, said second bias portion connected with the first bias portion at a connection portion, wherein said bias member biases said first leg and said second leg in a direction to push away a distal end of said first leg and a distal end of said second leg from each other, and an open width adjusting member including a rotatable width adjustment wheel, wherein an acceptable opening width between said distal end of said first leg and said distal end of said second leg is adjusted by the rotation of said width adjustment wheel, wherein said width adjustment wheel is positioned distally closer towards said distal end of said first leg and said distal end of the second leg than the connecting portion of said first bias portion and said second bias portion, and is rotatable on an axis along an opening direction of said first distal end and said second distal end, and wherein said first mounting portion is positioned on the opposing side of said second leg with respect to said first leg, and a space formed between said first leg and said first mounting portion, and said width adjusting wheel is arranged within said space.

16. A tweezers device, comprising:

a first mounting portion for attaching a first tip, a first leg to hold said first mounting portion, a second mounting portion for attaching a second tip, a second leg to hold said second mounting portion, a bias member having a first bias portion where said first mounting portion is fixed, and a second bias portion where said second mounting portion is fixed, said second bias portion connected with the first bias portion at a connection portion, wherein said bias member biases said first leg and said second leg in a direction to push away a distal end of said first leg and a distal end of said second leg from each other, and an open width adjusting member including a rotatable width adjustment wheel, wherein an acceptable opening width between said distal end of said first leg and said distal end of said second leg is adjusted by the rotation of said width adjustment wheel, wherein said width adjustment wheel is positioned distally closer towards said distal end of said first leg and said distal end of the second leg than the connecting portion of said first bias portion and said second bias portion, and is rotatable on an axis along an opening direction of said first distal end and said second distal end, and further comprising a positon adjusting wheel, wherein by the rotation of said position adjusting wheel, the position between said distal end of the first leg and said distal end of the second leg is adjusted in a direction orthogonal to the virtual plane formed by a movement trace of the first leg and the second leg.

17. The tweezers device according to claim 16, wherein said width adjusting wheel and said position adjusting wheel are rotatable around axes parallel to each other.

18. The tweezers device according to claim 16, further comprising a housing which covers said first mounting portion and said second mounting portion, wherein said width adjustment wheel and said position adjustment wheel are exposed from said housing in the same direction.

* * * * *